Feb. 5, 1957 R. D. McPHEE 2,780,109
HINGE PIN LOCK
Filed July 22, 1954
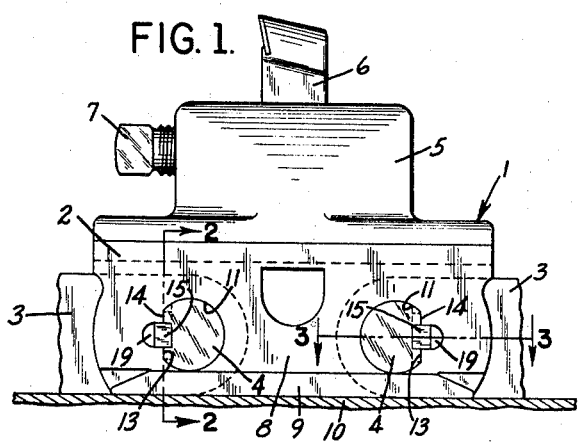
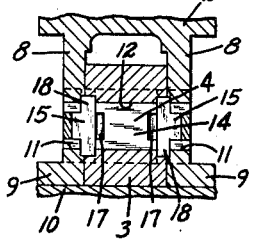 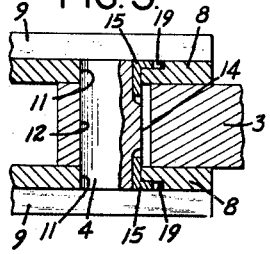 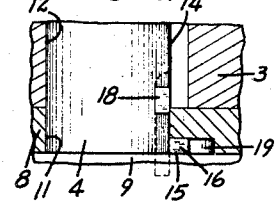
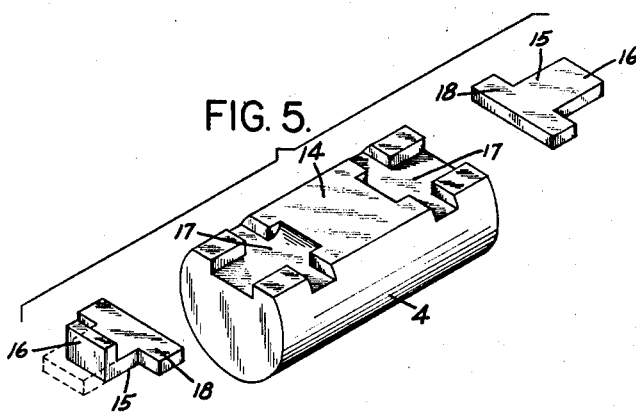 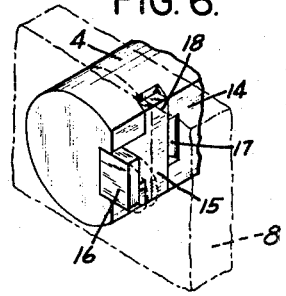
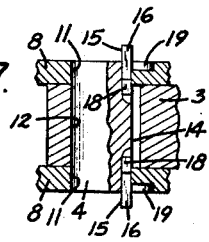
INVENTOR:
RAYMOND D. McPHEE
BY Charles F. Osgood,
ATTORNEY United States Patent Office 2,780,109
Patented Feb. 5, 1957

2,780,109

HINGE PIN LOCK

Raymond D. McPhee, Claremont, N. H., assignor to Joy Manufacturing Company, Pittsburgh, Pa., a corporation of Pennsylvania Application July 22, 1954, Serial No. 445,102

10 Claims. (Cl. 74—254)

This invention relates to pivoted link chains and more particularly to locking means for the hinge pins of a pivoted link chain for locking the pin against axial displacement.

In pivoted link chains the links are usually pivotally connected together by hinge pins and the latter, particularly in mining machine cutter chains, are held against rotation relative to the chain blocks or cutter links and are locked against axial displacement from the cutter blocks or links. Various forms of pin locks have heretofore been devised and the present invention contemplates improvements over such known types of pin locks in that the locking means is relatively simple, inexpensive and durable in design and may be readily released to permit removal of the hinge pins when desired.

An object of the present invention is to provide an improved pivoted link chain. Another object is to provide an improved locking means for the hinge pin of a pivoted link chain. Yet another object is to provide an improved pin locking means comprising deformable locking elements interlocked with the pin and having deformable or bendable portions receivable in recesses in the associated chain link. A further object is to provide an improved pin lock comprising a locking eyement of T-shape received in a T-shaped recess in the pin. A still further object is to provide an improved pin lock of a simple, rugged and inexpensive design, which may be applied to a conventional chain with a minimum of change. These and other objects and advantages of the invention will, however, more fully appear as the description proceeds.

In the accompanying drawing there is shown for purposes of illustration one form which the invention may assume in practice.

In this drawing:

Fig. 1 is a fragmentary side view of a cutter chain in which one illustrative form of the invention is embodied.

Fig. 2 is a cross section taken on line 2—2 of Fig. 1.

Fig. 3 is a horizontal section taken on line 3—3 of Fig. 1.

Fig. 4 is an enlarged fragmentary section taken on the plane of Fig. 3, showing the pin locked in locking position.

Fig. 5 is a perspective view of a hinge pin and its associated locking elements, with the latter separated from the pin for illustrative purposes.

Fig. 6 is a fragmentary perspective view showing a pin with its cooperating locking element in locking position, with the associated link shown in dotted lines.

Fig. 7 is a fragmentary section taken on the plane of Fig. 3, showing the locking pin in position within the link-bores, with the locking elements in unbent, non-locking position.

The cutter chain is generally designated 1 and includes a chain block or cutter link 2 and connecting links 3 and the block 2 and connecting links are pivotally connected together by hinge pins 4. Each block has a lateral lug 5 socketed to receive a cutter bit 6 held in position by a usual set screw 7. Each block has a base comprising parallel side portions 8 provided with lateral gibs 9 adapted for engagement with the guideway of a usual cutter bar or guide frame, shown at 10 in Fig. 1. The parallel side portions of the block base have aligned bores 11 disposed in registry with a bore 12 in a connecting link and the hinge pins 4 are fitted in the bores 11, and the bores 11 have flat or plane side surfaces 13 with which a flattened plane surface 14 on the pins engages for holding the pins against rotation in the bores, all in a well-known manner.

Improved locking means for holding the hinge pins against axial displacement comprises T-shaped locking elements 15 having a deformable or bendable outer end 16 of readily deformable metal and the hinge pins have T-shaped recesses or crossed slots 17 for receiving the T-shaped locking elements. These crossed slots or recesses are formed in the plane side of the pin, as shown in Fig. 5, although evidently the crossed slots or recesses may be formed at any desired location about the exterior peripheries of the pins. If desired, one of the locking elements may be pre-formed with its outer end portion bent into right-angular relation with respect to the T-head, as shown at the left in Fig. 5, although if desired both locking elements may be of unbent form, as shown at the right in Fig. 5.

During assembly of the hinge pins the T-shaped head 18 of the locking elements may be fitted within the pin-recesses 17 thereby to longitudinally interlock the same together, with the pin positioned axially within the aligned bores in the chain block and connecting links, as shown in Fig. 7. The outer sides of the base portions 8 of the block are recessed or notched at 19 and when the parts are in the position shown in Fig. 7, the outer ends of the locking elements are bent inwardly into the notches or recesses 19 thereby to lock the hinge pins against axial displacement from the bores of the base-portion 8. As stated above, one of the locking elements may be pre-formed or bent with its outer portion 16 received within the notch or recess 19 upon assembly of the pin so that only one of the locking elements need be deformed or bent into locking position. When it is desired to remove the pins, one of the locking elements may be bent back into its initial straightened position to release the pin from the chain block or, if desired, the hinge pin may be axially hammered out causing the locking elements either to shear off or bend out straight.

As a result of this invention, an improved hinge pin lock is provided for a pivoted link chain for locking the hinge pins against axial displacement. By the provision of the locking elements of T-shape fitted within T-shaped recesses in the pins and by bending the locking elements into locking position upon assembly, the hinge pins may be effectively locked in position on the block. The locking elements are of a simple, rugged and inexpensive design and may be readily released to permit removal of the hinge pins when desired. These and other advantages of the invention will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a pivoted link chain, cooperating chain links, a hinge pin for pivotally connecting said links together, said pin having a relatively shallow peripheral recess including right-angled portions respectively extending longitudinally and transversely of said pin, said longitudinal portion opening out through an end of said pin, and means for locking said pin against axial displacement from its associated link comprising a deformable locking element having right-angled portions received in said longitudinal and transverse portions of said recess in said pin for longitudinally interlocking said locking element with said pin, said longitudinal portion of said locking element having a deformable outer end bendable inwardly against an outwardly facing surface at the side of the associated link.

2. A pivoted link chain as set forth in claim 1 wherein said inner portion of said locking element is of T-shape and said pin-recess is of T-shape for receiving said T-shaped portion of said locking element.

3. A pivoted link chain as set forth in claim 1 wherein said pin has a plane side surface extending lengthwise thereof and engaging a plane surface on the associated link for holding the pin against rotation, and said pin-recess is formed in the plane side of said pin, said locking element when in locking position having a plane outer surface substantially flush with said plane side surface of said pin.

4. A pivoted link chain as set forth in claim 1 wherein said deformable outer portion of said locking element, when the latter is interlocked with said pin, extends outwardly beyond the adjacent end of said pin and is bendable inwardly into a notch in the side of the associated link with the outer surface of said locking element substantially flush with said adjacent end surface of said pin.

5. In a pivoted link chain, cooperating chain links, a hinge pin for pivotally connecting said links together, said hinge pin having a relatively shallow peripheral recess of T-shape, and means for locking said pin against axial displacement from its associated link comprising a locking element of generally T-shape with its inner head portion seated in said recess in longitudinally interlocking relation with said pin, said locking element having its outer portion at the leg of the T composed of readily bendable metal and bendable laterally into engagement with an outwardly facing surface of said associated link.

6. In a pivoted link chain, cooperating chain links, a hinge pin for pivotally connecting said links together, said pin having a relatively shallow peripheral recess opening through an end of said pin, said recess having a portion extending transversely of said pin, and means for locking said pin against axial displacement from its associated link comprising a separable locking element received in said recess and having a transverse portion fitting said transverse portion of said recess for longitudinally interlocking said locking element with said pin, said locking element having an outer end projecting outwardly from said recess beyond said end of said pin and bendable laterally beyond the pin-periphery to lock the pin to the associated link.

7. A pivoted link chain as set forth in claim 6 wherein said associated link is notched and said locking element has its bendable outer end receivable in said notch.

8. A pivoted link chain as set forth in claim 6 wherein the associated link has a bore in which the pin is fitted and the walls of the bore serve to maintain said separable locking element in interlocking relation with said pin with the outer surface of said locking element which lies within said link-bore substantially flush with the pin-periphery.

9. A pivoted link chain as set forth in claim 6 wherein said outer end of said locking element is bendable into straightened position to release said locking element from said associated link to permit axial displacement of said pin.

10. A pivoted link chain as set forth in claim 5 wherein said associated link has a recess at its outer side into which said outer bendable portion of said locking element is receivable with the bottom surface of said link recess providing said outwardly facing surface of said associated link.

References Cited in the file of this patent
UNITED STATES PATENTS

| | | |
|---|---|---|
| 2,280,502 | Stenger | Apr. 21, 1942 |
| 2,558,213 | Forbes | June 26, 1951 |